Sept. 4, 1934.  W. W. REESE  1,972,794
OUTLET BOX FOR ELECTRIC INSTALLATION
Filed Dec. 14, 1932  2 Sheets-Sheet 1
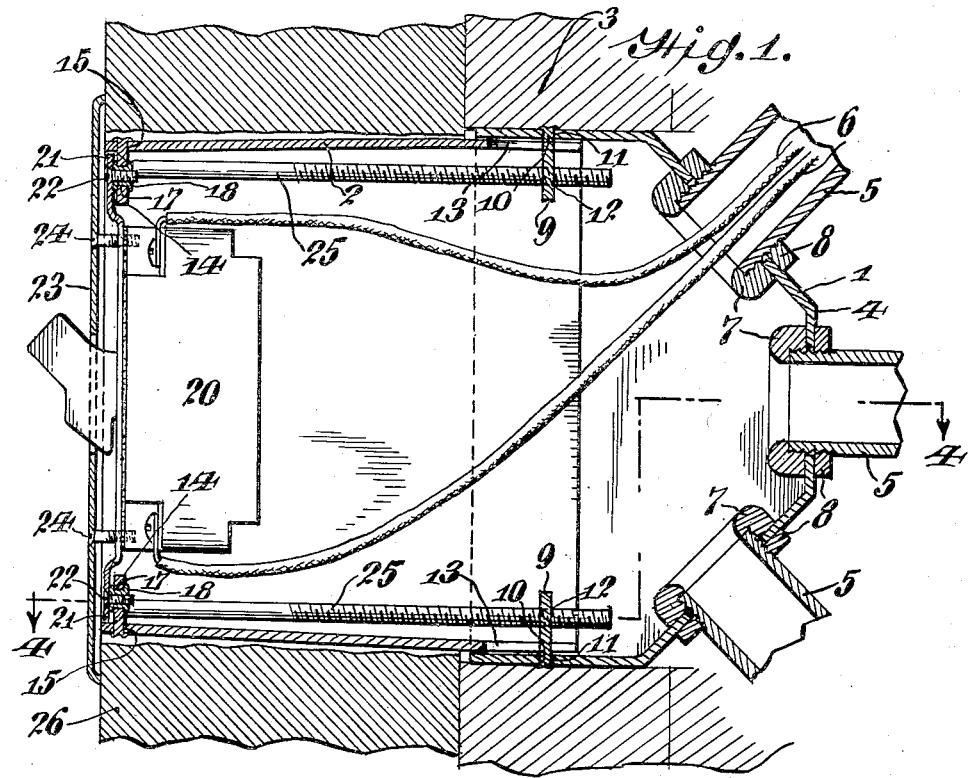
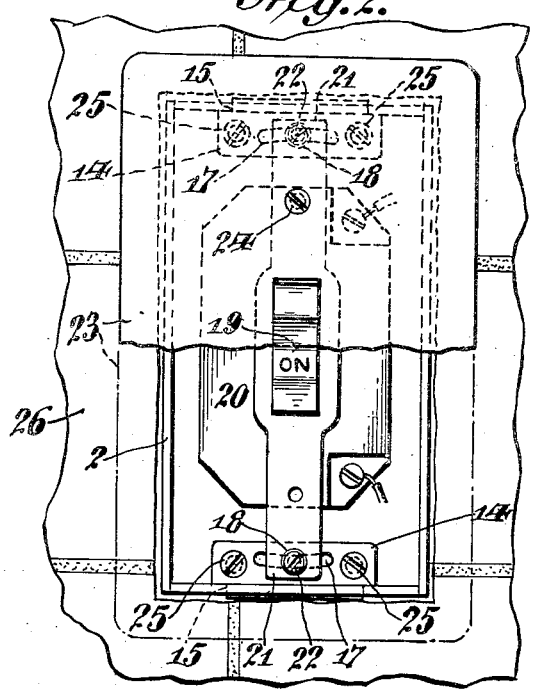
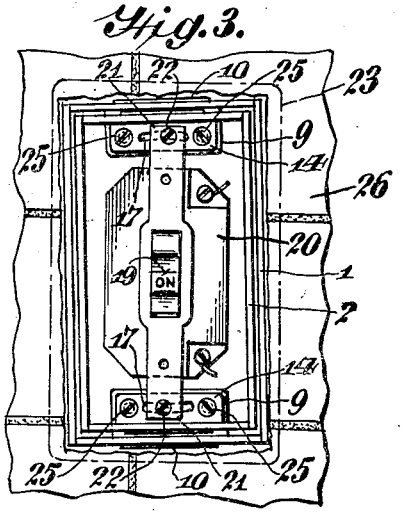
William W. Reese,
INVENTOR
BY Victor J. Evans
ATTORNEY

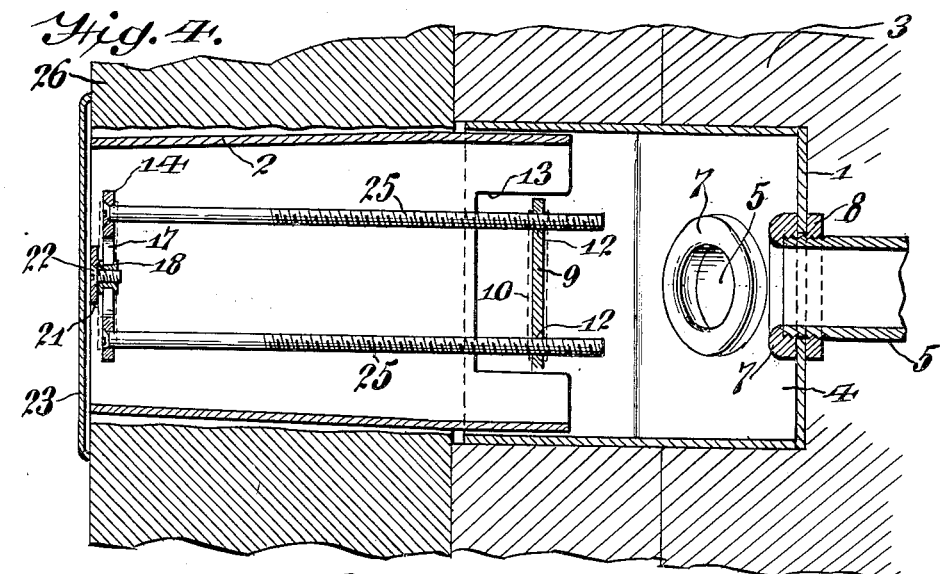
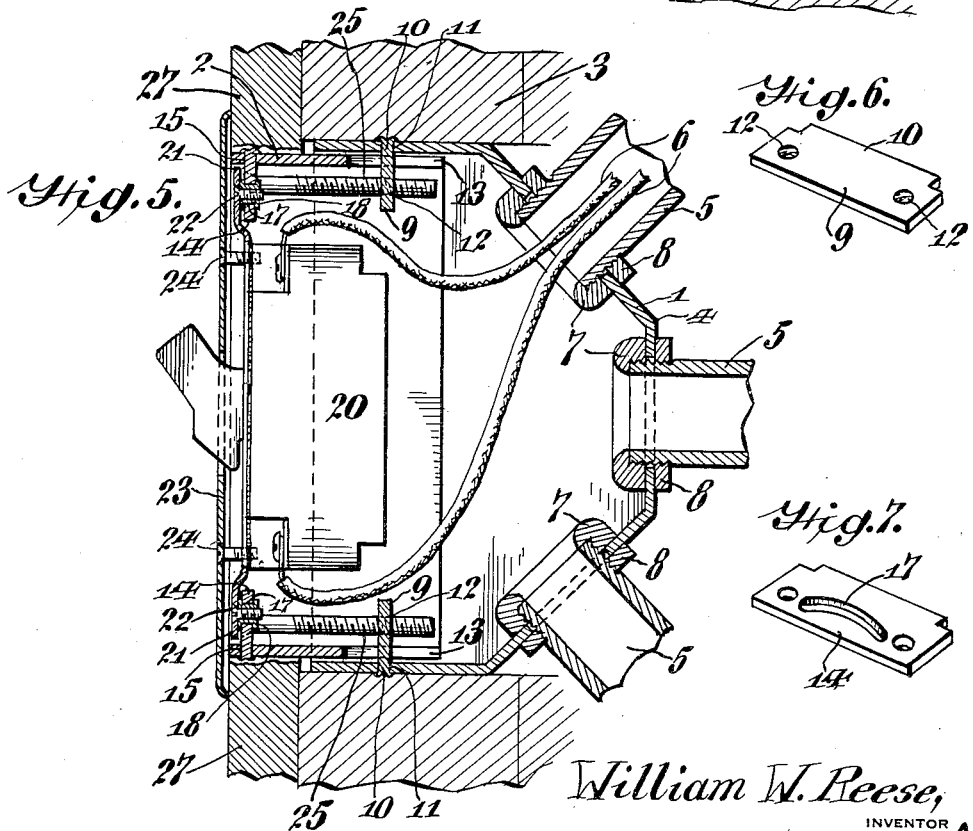

Patented Sept. 4, 1934

1,972,794

UNITED STATES PATENT OFFICE 1,972,794

OUTLET BOX FOR ELECTRIC INSTALLATION

William W. Reese, Upper Darby, Pa.

Application December 14, 1932, Serial No. 647,257

2 Claims. (Cl. 247—19)

This invention relates to an improved outlet box for use in connection with electrical installation such as wiring, and to provide such a box as would accommodate the usual switch.

In this class of work, wherein there is used a box (which is extensible) it is customary to first provide the rough wall of brick, which is either built up around the fixed section of the box, or in which an opening is cut to receive the fixed section of the box, and then the finished portion of the wall is completed, either around the extensible section of the box or an opening is formed therein to receive the extensible section. In this way means are provided for rendering the extensible section adjustable to accommodate the thickness of the finished wall.

Another purpose is to provide, in an outlet box means whereby the extensible section may be so arranged as to conform to the exterior surface of the finished wall, in order to accommodate itself to the usual facing plate which is positioned over the switch.

Another purpose is to provide, in an article of this kind means whereby the switch when installed in the extensible section, may be adjusted to accommodate itself to the usual facing plate, as well as accommodate itself to the position of the extensible section of the outlet box.

A still further purpose is to provide an outlet box, wherein the fixed section of the box has its bottom of polygonal contour, in order to connect certain of the wire housing conduits to the fixed section of the box, so as to avoid moving the lead wires around a right angle corner, when snaking them through the conduits.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a vertical sectional view through the rough brick work and the finished wall of the building structure, showing the improved outlet box installed and in section, showing the conduits connected to the box.

Figure 2 is a view in elevation of the exterior face of the finished wall, showing the facing or cover plate broken substantially midway its length, disclosing half of the open face of the box in full lines and the other half in dotted lines and also illustrating the switch.

Figure 3 is a view in elevation of the open face of the outlet box, but showing the same slightly out of plumb and illustrating means whereby the switch can be mounted plumb with the facing or cover plate.

Figure 4 is a sectional view on line 4—4 of Figure 1.

Figure 5 is a view similar to Figure 1, but illustrating a different size of extensible section of the box for the purpose of accommodating a finished wall of tiling or the like.

Figure 6 is a detail view in perspective of the ear 9.

Figure 7 is a detail perspective view of the ear 14.

Referring to the drawings 1 and 2 identify the fixed and extensible sections of the outlet box, which as shown in Figures 2 and 3 are of oblong contour, though any other shape may be used. The fixed section of the box is mounted in the usual manner in the rough brick portion 3 of the wall, and it will be noted that the bottom 4 of this fixed section is of polygonal formation. Previous to the installation of the outlet box and particularly the fixed section thereof, the several faces of the polygonal bottom is provided with disc closed openings of the usual type, and just before installing the fixed section, such discs (not shown) are usually knocked out for the reception of conduits 5 in which the usual wire 6 is housed. Such conduits have their threaded ends inserted through such openings, with bushings 7 threaded on the extremities of the conduits against the inner face of the bottom, with lock nuts 8 also threaded on the conduits against the exterior surfaces of the bottom, thereby holding the conduits in position. The reason for the polygonal shaped bottom is to permit the wiring 6 to be snaked through more conveniently, because of eliminating the undesirable method of moving the wires over a decided right angle bend. The fixed section of the box is provided with inwardly extending ears 9, which have their reduced portions 10 fastened in openings 11 of the wall of the fixed section, the reduced portions of the ears 9 being shown in Figure 6. The ears 9 have threaded openings 12.

It is obvious upon referring to Figures 1 and 5 that the extensible section of the box can be of any depth, and consequently any shape in cross section, though it is shown as being oblong. The upper and lower end walls of the inner portion of the extensible section are cut away as shown at 13 or recessed to straddle the ears 9 in order to permit the extensible section to be adjusted.

Adjacent the extreme outer portion of the extensible section additional ears 14 are provided, and have reduced edges, which are secured in the openings 15 on the upper and lower end walls of the extensible section 2, by means of peening over the edges of the ears. These ears are shown in Figure 7 and are similar to those in Figure 6, with the exception that the ears 14 have arcuate slots 17, in which flanged bushings 18 are mounted for sliding movement in the openings 17. These arcuate openings 17 are curved on an arc, using the axis 19 of the switch 20 as a center. The switch 20 has extension pieces 21 adjacent its upper and lower ends, and these extensions receive screws 22, which are threaded into the bushings 18. Obviously by tightening up on the screws 22 it is possible to draw the bushings tightly in place, and therefore bind the extensions 21 against the ears 14, and hence holding the switch in position. It is possible by loosening the screws 22 to adjust the switch to a plumb vertical position, though the box and its extension section 2 may be out of plumb. It is obvious that as long as the switch is plumb in position, the usual face or cover plate 23 for the switch and the outlet box may be held plumb, due to the fact that the plate 23 is fastened to the switch by means of the screws 24.

Also threaded through the ears 14 are screws 25, which are in turn threaded through the ears 9, so that by adjusting the screws the extension section can be arranged in various positions. It is also obvious that the screws 25 may be differently adjusted for the purpose of insuring leveling the open face of the extensible section of the box flush with the exterior surface of the finished wall 26, which in Figure 1 is of substantial thickness. In Figure 5 of the drawings the finished wall 27 is considerably thinner than the wall 26 and may be made up of conventional type of tiling, while the wall 26 may be that of plaster or the like. Also in the structure in Figure 5 the screws 25 are much shorter than those shown in Figure 1, due to the relative difference between the finished walls.

The invention having been set forth, what is claimed is:

1. In an outlet box for electrical installation, a fixed box section supported and imbedded in the rough work of a wall and provided with inwardly projecting ear plates, an extensible box section corresponding to and mounted in the fixed box section for telescopical movements, the upper and lower walls of the extensible box section having ear plates projecting inwardly and being adjacent the outer open face, screws extending through and carried by each of the last named upper and lower ear plates and in turn threaded to the first ear plates, thereby rendering the extensible box section adjustable to accommodate the thickness of a finished wall section, the upper and lower walls of the extensible box section adjacent the inner end being cut away to straddle the first ear plates.

2. In an outlet box for electrical installation, a fixed box section supported and imbedded in the rough work of a wall and provided with inwardly projecting ear plates, an extensible box section corresponding to and mounted in the fixed box section for telescopical movements, the upper and lower walls of the extensible box section having ear plates projecting inwardly and being adjacent the outer open face, screws extending through and carried by each of the last named upper and lower ear plates and in turn threaded to the first ear plates, thereby rendering the extensible box section adjustable to accommodate the thickness of a finished wall section, the upper and lower walls of the extensible box section adjacent the inner end being cut away to straddle the first ear plates, said ear plates of the extensible box section having slots, sleeves guided in the slots, a switch support carrying a switch and having its ends overlying the slotted ear plates, means carried by the ends of the switch support and adjustably connected through the sleeves for clamping the parts together, said slots being curved concentric with the axis of the extensible box section, whereby the switch support and the switch may be adjusted to perpendicular positions though the box may be out of plumb.

WILLIAM W. REESE.